(12) United States Patent
Kim et al.

(10) Patent No.: US 11,691,391 B2
(45) Date of Patent: *Jul. 4, 2023

(54) FILM FOR GLASS LAMINATION, COMPOSITION FOR GLASS LAMINATION FILM, AND LAMINATED GLASS COMPRISING GLASS LAMINATION FILM

(71) Applicant: SKC Co., Ltd., Suwon-si (KR)

(72) Inventors: Hyejin Kim, Suwon-si (KR); Kyuhun Kim, Seoul (KR); Haksoo Lee, Suwon-si (KR)

(73) Assignee: SKC Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,346

(22) Filed: Nov. 30, 2020

(65) Prior Publication Data

US 2021/0078302 A1  Mar. 18, 2021

Related U.S. Application Data

(63) Continuation of application No. PCT/KR2019/002721, filed on Mar. 8, 2019.

(30) Foreign Application Priority Data

Jun. 5, 2018 (KR) .......................... 10-2018-0065124

(51) Int. Cl.
*B32B 17/10* (2006.01)
*C08K 5/159* (2006.01)

(52) U.S. Cl.
CPC ........ *B32B 17/10605* (2013.01); *B32B 17/10* (2013.01); *B32B 17/10036* (2013.01); *B32B 17/10761* (2013.01); *C08K 5/159* (2013.01); *B32B 2250/40* (2013.01); *B32B 2605/00* (2013.01)

(58) Field of Classification Search
CPC ..................................................... C08K 5/159
See application file for complete search history.

(56) References Cited

U.S. PATENT DOCUMENTS

| | | | |
|---|---|---|---|
| 11,498,313 B2 * | 11/2022 | Kim ........................ | C08K 5/159 |
| 2012/0263958 A1 * | 10/2012 | Iwamoto ................ | C08K 5/103 |
| | | | 428/501 |
| 2016/0082688 A1 | 3/2016 | Nakai et al. | |
| 2016/0168324 A1 * | 6/2016 | Okui ........................ | C08G 2/10 |
| | | | 528/403 |

(Continued)

FOREIGN PATENT DOCUMENTS

| CN | 105793208 A | 7/2016 |
|---|---|---|
| CN | 107215052 A | 9/2017 |

(Continued)

OTHER PUBLICATIONS

International Search Report dated Jul. 9, 2019 in counterpart International Patent Application No. PCT/KR2019/002721 (2 pages in English and 2 pages in Korean).

*Primary Examiner* — David Sample
(74) *Attorney, Agent, or Firm* — NSIP Law

(57) ABSTRACT

A film for laminating glass includes a first surface layer, a second surface layer opposite the first surface layer, and an interlayer disposed between the first surface layer and the second surface layer, wherein the interlayer includes a trioxane-based compound.

14 Claims, 3 Drawing Sheets

(56) References Cited

U.S. PATENT DOCUMENTS

2017/0349742 A1* 12/2017 Horiguchi ............... C08L 59/04
2019/0084277 A1* 3/2019 Nakamura ........ B32B 17/10605

FOREIGN PATENT DOCUMENTS

| | | | | |
|---|---|---|---|---|
| DE | 10343385 A1 * | 4/2005 | ....... | B32B 17/10761 |
| JP | 4-175248 A | 6/1992 | | |
| JP | 2000-280414 A | 10/2000 | | |
| JP | 3153904 B2 | 4/2001 | | |
| JP | 2006-513284 A | 4/2006 | | |
| JP | 2016-94340 A | 5/2016 | | |
| JP | 2016-183076 A | 10/2016 | | |
| JP | 2017-82099 A | 5/2017 | | |
| KR | 10-2015-0049910 A | 5/2015 | | |
| KR | 10-1558835 B1 | 10/2015 | | |
| KR | 10-2017-0084220 A | 7/2017 | | |
| WO | WO 2017/204121 A1 | 11/2017 | | |

* cited by examiner

FILM FOR GLASS LAMINATION, COMPOSITION FOR GLASS LAMINATION FILM, AND LAMINATED GLASS COMPRISING GLASS LAMINATION FILM

CROSS-REFERENCE TO RELATED APPLICATIONS

This application is a continuation of International Application No. PCT/KR2019/002721 filed on Mar. 8, 2019, which claims the benefit of Korean Patent Application No. 10-2018-0065124 filed on Jun. 5, 2018, in the Korean Intellectual Property Office, the entire disclosures of which are incorporated herein by reference for all purposes.

BACKGROUND

1. Field

The present disclosure relates to film for glass lamination, composition for glass lamination film, and laminated glass including glass lamination film.

2. Description of the Background

Plasticized polyvinyl acetal may be used for manufacture of films applied as an interlayer inside a light transmission laminate such as a laminated glass (e.g., enhanced glass and safety glass) or a polymer laminate.

Laminated glass refers to transparent laminate, for example, manufactured by placing a polyvinyl butyral sheet between two sheets of glass. Laminated glass is used for providing transparent walls in handrails in architecture, architectural cladding, windshields of automobiles and so on.

Functions of laminated glass include preventing penetration through laminated glass (penetration resistance) and absorbing energy caused from impact to minimize damage or injury of objects or people inside the transparent walls (impact resistance). In addition, an objective of laminated glass may be to have excellent optical properties applicable to clear glass, and also have robust environmental degradation resistant properties such as to moisture (optical properties and moisture resistance). The interlayer sheet applied to laminated glass may also give laminated glass additional functionalities such as reducing transmittance of sound noise, ultraviolet (UV) rays, and/or infrared (IR) rays.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a film for laminating glass includes a first surface layer, a second surface layer opposite the first surface layer, and an interlayer disposed between the first surface layer and the second surface layer, wherein the interlayer includes a trioxane-based compound.

The trioxane-based compound may be included in an amount of 0.001 to 4 wt % with respect to a total weight of the interlayer.

A haze value of the film for laminating glass may have a difference within 15% after a moisture resistance test, which includes digesting the film in deionized water of 50° C. for 3 hours, compared to a haze value of the film for laminating glass before the moisture resistance test.

The first surface layer may include a plasticized first polyvinyl acetal.

The second surface layer may include a plasticized second polyvinyl acetal.

The interlayer may be a multilayer structure including a first interlayer including a plasticized third polyvinyl acetal and the trioxane-based compound, a second interlayer including a plasticized fourth polyvinyl acetal disposed between the first interlayer and the first surface layer, and a third interlayer including a plasticized fifth polyvinyl acetal disposed between the first interlayer and the second surface layer.

The interlayer may have a monolayer structure including a plasticized third polyvinyl acetal and the trioxane-based compound.

The amount of a plasticizer contained in the first surface layer may be less than the amount of a plasticizer contained in the interlayer.

The amount of the plasticizer included in the first surface layer and the amount of the plasticizer included in the interlayer may have a difference of 5 to 18 wt %.

An amount of hydroxyl group of the fourth polyvinyl acetal may have a value between an amount of hydroxyl group in the first polyvinyl acetal and an amount of hydroxyl group in the third polyvinyl acetal.

The trioxane-based compound may be included in an amount of 1 wt % or less with respect to a total weight of the film for laminating glass.

The trioxane-based compound may have 1,3,5-trioxane skeleton and 1 to 3 carbon atoms out of the 3 carbon atoms included in the skeleton may independently have hydrogen or alkyl group having 1 to 5 carbon atoms, respectively.

A method of manufacturing the film for laminating glass may include kneading extruding i) a composition for a surface layer including a first polyvinyl acetal and ii) a composition for an interlayer including a plasticizer, a third polyvinyl acetal and a trioxane-based compound in an amount of 0.001 to 4 wt %, respectively, laminating a surface layer molten resin including the extruded composition for a surface layer and an interlayer molten resin including the extruded composition for an interlayer, wherein the extruded composition for a surface layer is laminated to be disposed on and under the extruded composition for an interlayer, thereby manufacturing a laminated molten resin, and forming the laminated molten resin into a sheet shape to manufacture a film for laminating glass.

A laminated glass may include a laminate in which the film for laminating glass is disposed between two sheets of glass.

A vehicle may include the laminated glass.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
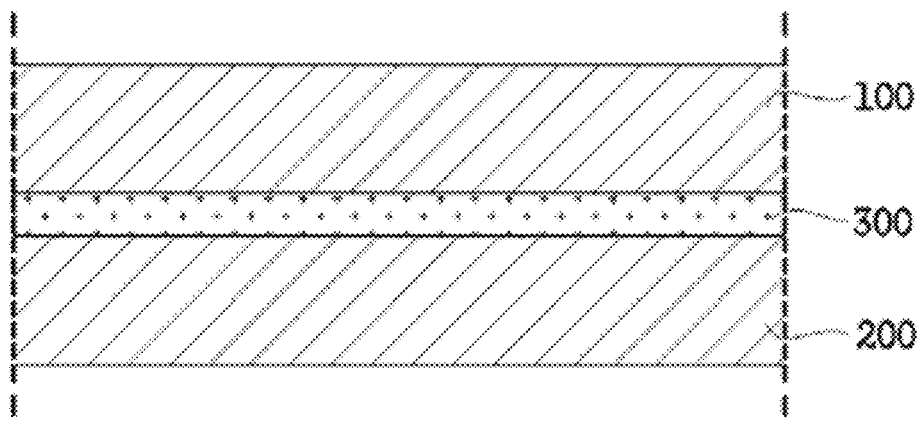
FIG. 1A is a drawing illustrating sections of a film for laminating glass according to one or more examples.

Hereinafter, while examples of the present disclosure will be described in detail with reference to the accompanying drawings, it is noted that the present disclosure is not limited to the examples presented.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

In the present specification, the term "combination of" included in Markush type description means mixtures or combinations of one or more elements described in Markush type and thereby means that the disclosure includes one or more elements selected from the Markush group.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

In the present specification, weight average molecule quantity or number average molecule quantity is expressed with omitting Dalton (Da) that is the unit. The weight average molecule quantity and so on are described based on the values measured using GPC (gel permeation chromatography)–ELSD (Evaporative Light Scattering Detector), however the measuring method is not limited thereto.

An object of the present disclosure is to provide a multilayer film for laminating glass of which moisture resistance and optical properties are enhanced.

A film for laminating glass having functionalities may be formed in a laminate shape which is a multilayer structure film having three or more layers laminated, in such a multilayer structure film, melt fracture may occur in interlayers when the film is extruded, and the melt fracture does not disappear even after glass laminating so the trace as an optical defect (distortion) is observed in some cases. The inventors of the present disclosure recognized these problems and conducted research for methods to solve the problems, and as a result, verified that these problems can be solved by applying trioxane-based compounds in one or more example embodiments as described herein.

Figure 1B:
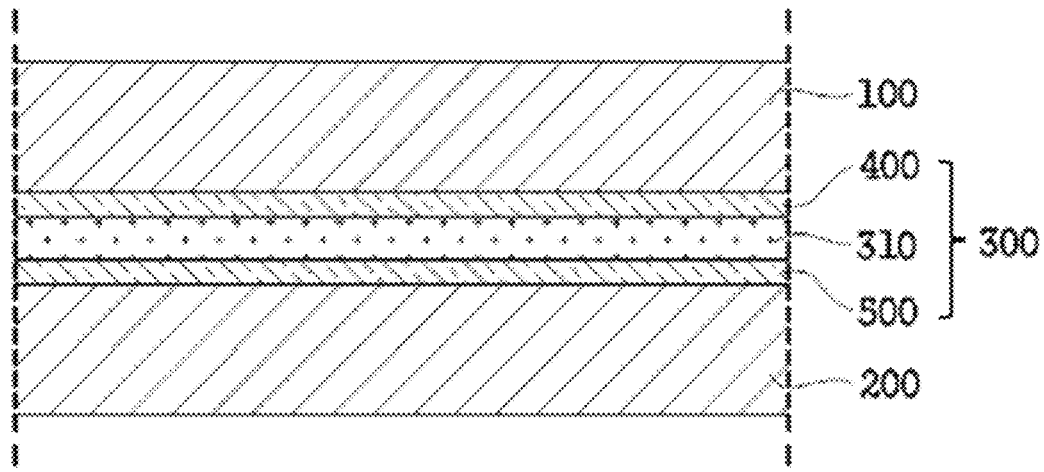
FIG. 1B is a drawing illustrating sections of a film for laminating glass according to one or more examples.

FIGS. 1A and 1B are drawings illustrating examples of a section of film for laminating glass. Referring to FIGS. 1A and 1B, the film for laminating glass 900 may include a first surface layer 100, a second surface layer 200 opposite the first surface layer, and an interlayer 300 placed between the first surface layer and the second surface layer, wherein the interlayer 300 may include a trioxane-based compound.

The trioxane-based compound functions as a fluidity improver of a molten resin in manufacturing processes of the film.

The trioxane-based compound may be, for example, applied with one or more types among a trioxane-based compound having 1,3,5-trioxane skeleton, a trioxane-based compound having 1,2,4-trioxane skeleton, and a trioxane-based compound having 1,2,3-trioxane skeleton.

For example, the trioxane-based compound may have the 1,3,5-trioxane skeleton and 1 to 3 carbon atoms out of the 3 carbon atoms comprised in the skeleton may independently have hydrogen or alkyl group having 1 to 5 carbon atoms, respectively, thus the trioxane-based compound may have the structure of Formula1 below.

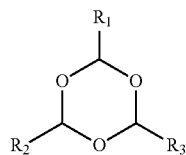

[Formula 1]

In the Formula 1, the R1, R2 and R3 is independently hydrogen or alkyl group having 1 to 5 carbon atom(s), respectively.

Specifically, the R1, R2 and R3 is independently hydrogen or alkyl group having 1 to 5 carbon atoms, respectively, except the case in which all the R1, R2 and R3 are hydrogen.

The trioxane-based compound may be trialkyl trioxane, and may be specifically any one selected from the group consisting of 2,4,6-trimethyl-1,3,5-trioxane, 2,4,6-triethyl-1,3,5-trioxane, 2,4,6-tri(n-propyl)-1,3,5-trioxane, 2,4,6-tri(iso-propyl)-1,3,5-trioxane, 2,4,6-tri(n-butyl)-1,3,5-trioxane, 2,4,6-tri(sec-butyl)-1,3,5-trioxane, 2,4,6-tri(isobutyl)-1,3,5-trioxane, 2,4,6-tri(tert-butyl)-1,3,5-trioxane, 2,4,6-tripentyl-1,3,5-trioxane and combinations thereof.

The trialkyl trioxane may improve fluidity of a molten resin in manufacturing processes of the film for laminating glass.

The trialkyl trioxane may be tripropyl trioxane, and may be specifically any one selected from the group consisting of 2,4,6-tri(n-propyl)-1,3,5-trioxane, 2,4,6-tri(iso-propyl)-1,3,5-trioxane and any one selected from the group consisting of combinations thereof.

The tripropyl trioxane may be compatible with polyvinyl acetals and plasticizers having different polarity from each other, respectively, so as to express excellent activity as a fluidity improver in manufacturing processes of the film for laminating glass, particularly improving fluidity of an interlayer molten resin and decreasing remarkably the occurrence of optical defects over the entire film.

The trioxane-based compound may be comprised in an amount of 0.001 to 4 weight percent (wt %), 0.01 to 3 wt %, or 0.1 to 1.6 wt % with respect to a total weight of the film for laminating glass. When the interlayer comprises a trioxane-based compound in an amount of more than 4 wt %, enhancing fluidity and decreasing optical defects effect are induced but moisture resistance may be degraded, and when the interlayer comprises a trioxane-based compound in an amount of less than 0.001 wt %, enhancing fluidity effect for a molten resin by applying the trioxane-based compound may be insignificant. When a trioxane-based compound is applied to an interlayer in an amount of the range described above, improving optical properties effect and enhancing moisture resistance effect may be obtained simultaneously.

The trioxane-based compound may be comprised in an amount of 1 wt % or less, 0.001 to 0.75 wt %, 0.01 to 0.65 wt %, or 0.04 to 0.3 wt % with respect to a total weight of the film for laminating glass. When including the trioxane-based compound in an amount of the range described above, the film does not or insignificantly exhibits moisture resistance degradation phenomenon overall and the optical properties may be enhanced.

The trioxane-based compound may be specifically 2,4,6-tripopyl 1,3,5-trioxane. Such a trioxane-based compound is more effective for applying as a fluidity improver in the film for laminating glass particularly when interlayers are manufactured, to enhance optical properties and moisture resistance of the film for laminating glass simultaneously.

The first surface layer 100 and the second surface layer 200 may contain a polyvinyl acetal, an ionomer, a polyethylene terephthalate, or a polyimide, respectively.

The polyvinyl acetal may be a polyvinyl acetal obtained by acetalization of a polyvinyl alcohol having a degree of polymerization of 1,600 to 3,000 with an aldehyde, or a polyvinyl acetal obtained by acetalization of a polyvinyl alcohol having a degree of polymerization of 1,700 to 2,500 with an aldehyde. When these polyvinyl acetals are applied, mechanical properties like a penetration resistance may be enhanced sufficiently.

The polyvinyl acetal may be one in which polyvinyl alcohol and aldehyde are synthesized, and types of the aldehyde are not limited. Specifically, the aldehyde may be one selected from the group consisting of n-butyl aldehyde, isobutyl aldehyde, n-valeral aldehyde, 2-ethyl butyl aldehyde, n-hexyl aldehyde and blended resins thereof. When n-butyl aldehyde is applied as the aldehyde, manufactured polyvinyl acetal resins may have a refractive index characteristic that is a small difference of refractive index with glass, an excellent adhesion quality with glass, and so on.

The ionomer may comprise an olefin repeating unit in an amount of 20 to 95 wt %, 20 to 90 wt %, 40 to 95 wt %, or 40 to 75 wt %. The carboxylic acid repeating unit may be comprised in an amount of 5 to 80 wt %, 10 to 80 wt %, 5 to 60 wt %, or 25 to 60 wt %.

As a metal ion, a monovalent, divalent or trivalent metal ion may be applied, for example, $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$, $Sc^{3+}$, $Fe^{3+}$, $Al^{3+}$ and $Yt^{3+}$ may be applied.

The ionomer may be a copolymer of an ethylene repeating unit having 2 to 4 carbon atoms and an ethylenic-ally unsaturated carboxylic acid repeating unit having 3 to 6 carbon atoms, and may be an ionic compound comprising an acidic side chain of 5 mol % or more, in which the acidic side chain can be combined with the metal ion.

The polyethylene terephthalate resin may be the one having a crystallinity of 0% to 80%, 10% to 70%, or, for example, 40% to 60%. The polyethylene terephthalate resin may be a copolymerization resin, and the copolymerization resin may be one copolymerized with an ethylene glycol and a neopentyl glycol as glycol components.

The polyimide resin may be a resin manufactured by imidization of a polyamic acid derivative obtained from solution polymerization of an aromatic dianhydride and an aromatic diamine or an aromatic diisocyanate. For example, it may be one obtained by imidization of a polyamic acid resin synthesized from an aromatic acid dianhydride comprising a biphenyltetracarboxylic acid dianhydride and an aromatic diamine comprising a para-phenylene diamine, but is not limited thereto.

The first surface layer 100 may comprise a plasticized first polyvinyl acetal.

The first polyvinyl acetal may have hydroxyl group in an amount of 30 mol % or more, and acetyl group in an amount of 5 mol % or less. Specifically, the hydroxyl group may be comprised in an amount of 30 to 50 mol %, and the acetyl group may be comprised in an amount of 2 mol % or less. The first polyvinyl acetal resin may have a weight average molecular quantity of 200,000 to 300,000. When polyvinyl acetals having these characteristics are applied as the first polyvinyl acetal, a film for laminating glass having excellent adhesion with glass and mechanical strength may be manufactured.

The plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and mixtures thereof.

The first surface layer 100 may be formed into a film by melting extruding a composition for the first surface layer comprising a plasticizer and a first polyvinyl acetal, and further comprising other additives described as below in a predetermined range.

The second surface layer may comprise a plasticized second polyvinyl acetal.

The second polyvinyl acetal may have hydroxyl group in an amount of 30 mol % or more, and acetyl group in an amount of 5 mol % or less. Specifically, the hydroxyl group may be comprised in an amount of 30 to 50 mol %, and the acetyl group may be comprised in an amount of 2 mol % or less. When polyvinyl acetals having these characteristics are applied as the second polyvinyl acetal, a film for laminating glass having excellent adhesion with glass and mechanical strength may be manufactured.

The second polyvinyl acetal may be same or different with the first polyvinyl acetal.

The plasticizer of the second surface layer may be the same or different with the plasticizer of the first surface layer. The detailed description about a type of the plasticizer is duplicated with the above description, thus further description will be omitted here.

The interlayer 300 may comprise a plasticized third polyvinyl acetal and the trioxane-based compound.

The interlayer 300 may be a monolayer structure comprising a plasticized third polyvinyl acetal and the trioxane-based compound.

The interlayer 300 may be a multilayer structure comprising a first interlayer 310 comprising a plasticized third polyvinyl acetal and the trioxane-based compound, a second interlayer 400 placed between the first interlayer 310 and the first surface layer 100 comprising a plasticized fourth polyvinyl acetal, and a third interlayer 500 placed between the first interlayer 310 and the second surface layer 200 comprising a plasticized fifth polyvinyl acetal.

The interlayer 300 or the first interlayer 310 comprising trioxane-based compound may enable fluidity to be enhanced in a state of a molten resin, and formation of optical defects like melt fracture to be reduced.

The third polyvinyl acetal may have hydroxyl group in an amount of 40 mol % or less, and acetyl group in an amount of 8 mol % or more. The third polyvinyl acetal may have hydroxyl group in an amount of 1 to 30 mol %, and acetyl group in an amount of 1 to 15 mol %. When polyvinyl acetals having these characteristics are applied, a polyvinyl acetal film having sound insulation performance could be manufactured.

The third polyvinyl acetal may have a value of weight average molecular quantity of 490,000 to 850,000, of 610,000 to 820,000, or of 690,000 to 790,000. The third polyvinyl acetal resin may have a value of weight average molecular quantity of 700,000 to 760,000, or 720,000 to 750,000. In these cases, the effects that are improvements in co-extrusion workability and mechanical properties of the manufactured film as described elsewhere herein may be achieved at the same time.

The third polyvinyl acetal resin and the first polyvinyl acetal resin may have a difference of values of weight average molecular quantity, and the difference may be 250,000 to 500,000, 300,000 to 500,000, or 450,000 to 500,000. When the third polyvinyl acetal resin and the first polyvinyl acetal resin have such a difference of values of weight average molecular quantity as in the above range, superior properties in terms of adjusting extrusion temperature in processes, and the improved mechanical properties of the manufactured film may be achieved.

The third polyvinyl acetal resin may have a PDI (polydispersity index) value of 3.5 or less, 1.2 to 2.5, or 1.9 to 2.3.

The third polyvinyl acetal resin may have a melt index of 5 to 45 g/10 min in accordance with ASTM D1238 (150° C., 21.6 kg, 37% Kneader). Specifically, the melt index of the third polyvinyl acetal may be 6 to 35 g/10 min, 7 to 25 g/10 min, 8 to 15 g/10 min, or 8.5 to 12.5 g/10 min. When the third polyvinyl acetal resin having such a melt index as in the above range is applied, process stability may be enhanced.

The third polyvinyl acetal resin may have a viscosity (5% BuOH Sol.) value of 250 to 900 cP, or 500 to 750 cP in accordance with JIS K6728. When the third polyvinyl acetal satisfies this viscosity condition, mechanical properties of the film is enhanced and process efficiency in melting extruding is improved.

The plasticizer of the interlayer 300 or the first interlayer 310 may be the same or different with the plasticizer applied to the first surface layer 100. The detailed description about a type of the plasticizer is duplicated with the above description thus the statement will be omitted.

The fourth polyvinyl acetal has a value of hydroxyl group content between the content of hydroxyl group in the first polyvinyl acetal and the content of hydroxyl group in the third polyvinyl acetal. Specifically, the fourth polyvinyl acetal may have hydroxyl group in an amount of 20 to 45 mol %, or 30 to 45 mol %. When polyvinyl acetals having such a content of hydroxyl group as an above range are applied as the fourth polyvinyl acetal, interlayer heterogeneity which could be generated in the boundary side of the first polyvinyl acetal and the third polyvinyl acetal is alleviated, so the film for laminating glass having less defects could be manufactured.

The fifth polyvinyl acetal may be the one having the characteristics of the fourth polyvinyl acetal. The same one with the fourth polyvinyl acetal may be applied and the different one having above characteristics may be also applied.

The plasticizer of the second interlayer 400 and the third interlayer 500 may be the same one with the plasticizer applied to the first surface layer 100 or the different one. The detailed description about a type of the plasticizer is duplicated with the above description, thus further description will be omitted here.

The content of a plasticizer contained in the first surface layer 100 or the second surface layer 200 respectively may be less than the content of a plasticizer contained in the interlayer 300 or the first interlayer 310.

The content of a plasticizer comprised in the first surface layer 100 or the second surface layer 200 respectively and the content of a plasticizer comprised in the interlayer 300 or the first interlayer 310 may have a difference, and the difference may be 5 to 18 wt %, 5 to 15 wt %, or 5 to 10 wt %. When the content of the first surface layer 100 or the second surface layer 200 and the content of the interlayer 300 or the interlayer 310 have a difference as above, the film for laminating glass having further excellent optical properties and sound insulation performance may be manufactured due to containing the trioxane-based compound.

The first surface layer 100 or the second surface layer 200 may comprises the plasticizer in an amount of 21 to 29 wt % respectively with respect to a total weight of each layer, and in this case mechanical strength of the film may be further enhanced.

The interlayer 300 or the first interlayer 310 may comprise the plasticizer in an amount of 29 to 42 wt % respectively with respect to a total weight of each layer, and in this case heterogeneity between the first surface layer 100 and the second interlayer 400, or the second surface layer 200 and the third interlayer 500 is alleviated so that a film in which defects such as bubble generation are decreased may be manufactured.

The film for laminating glass 900 may have a difference of haze value after a moisture resistance test, which is digesting the film in deionized water of 50° C. for 3 hours, compared to a haze value of the film for laminating glass before the test, and the difference may be within 15%, 0 to 15%, or 0.1 to 15%. Such a difference means the excellent optical properties of the film due to comprising the trioxane-based compound are maintained above a certain level even after the moisture resistance test under harsh conditions.

The film for laminating glass 900 may have a haze value of 3% or less, 2.5% or less, or 0.1 to 2%.

The film for laminating glass 900 may further contain an additive selected from the group consisting of an antioxidant, a heat stabilizer, a UV absorber, a UV stabilizer, a glass adhesion regulator, and combinations thereof. The additive may be comprised in at least one layer out of each layer above, and due to inclusion of the additive, long-term durability such as thermal stability and light stability, and anti-scattering performance of the film can be enhanced.

As the antioxidant a hindered amine-based antioxidant or a hindered phenol-based antioxidant may be used. Specifically, in the process of manufacturing polyvinyl butyral (PVB) which needs a processing temperature of 150° C. or higher, a hindered phenol-based antioxidant may be used. The hindered phenol-based antioxidant, for example, may be Irganox 1976, 1010 or so on manufactured by BASF SE.

As a heat stabilizer, a phosphite-based heat stabilizer may be used considering suitability with an antioxidant. The heat stabilizer, for example, may be Irgafos 168 manufactured by BASF SE.

As an UV absorber, Chemisorb 12, Chemisorb 79, Chemisorb 74, or Chemisorb 102 manufactured by CHEMIPRO KASEI KAISHA, LTD or Tinuvin 328, Tinuvin 329, or Tinuvin 326 manufactured by BASF SE may be used. As an UV stabilizer, Tinuvin manufactured by BASF SE may be used. As an IR absorber, ITO, ATO, and AZO may be used, and as a glass adhesion regulator, a salt of a metal such as magnesium (Mg), potassium (K), sodium (Na), epoxy-based modified silicon (Si) oil, or a mixture thereof may be used, but the present disclosure is not limited thereto.

The film for laminating glass 900 may have a total thickness of 0.4 mm or more, specifically 0.4 to 1.6 mm, 0.5 to 1.2 mm, or 0.6 to 0.9 mm. Mechanical strength or sound insulation performance of the film for laminating glass may be enhanced as the thickness is increased, however considering minimal legal performance, cost and weight reduction, the range of thickness as above is suitable for manufacture of the film satisfying various conditions.

The first surface layer 100 and the second surface layer 200 may independently have a thickness of 0.01 to 0.05 mm, or 0.02 to 0.04 mm, respectively.

The interlayer 300 may have a thickness of 0.04 to 0.20 mm, 0.07 to 0.18 mm, or 0.09 to 0.15 mm.

The second interlayer 400 and the third interlayer 500 comprised in the film for laminating glass 900 may independently have a thickness of 0.1 mm or less, 0.09 mm or less, 0.001 to 0.1 mm, 0.001 to 0.08 mm, or 0.001 to 0.3 mm. When the second interlayer 400 and the third interlayer 500 are applied with such a thickness range optical defects that may be generated in boundary sides can be minimalized.

The composition for glass laminating film according to one or more other example embodiments of the present disclosure is a composition for interlayers comprising a plasticizer, a third polyvinyl acetal and a trioxane-based compound, and the trioxane-based compound is comprised in an amount of 0.001 to 4 wt % with respect to a total weight of the composition for interlayers.

The composition for glass laminating film is applied to manufacture of the film for laminating glass 900.

The film for laminating glass 900 comprises a first surface layer 100, a second surface layer 200 in counter of the first surface layer, and an interlayer 300 or a first interlayer 310 placed between the first surface layer and the second surface layer, and the composition for interlayers is applied to manufacture the interlayer 300 or the first interlayer 310.

The composition for interlayers may comprise the third polyvinyl acetal in an amount of 57 to 69 wt %, the plasticizer in an amount of 30 to 42 wt % and the trioxane-based compound in an amount of 0.001 to 4 wt %. Specifically, the composition for interlayers may comprise the third polyvinyl acetal in an amount of 63 to 68 wt %, the plasticizer 31 to 36 wt % and the trioxane-based compound in an amount of 0.001 to 4 wt %. The composition for interlayers may further comprise an extra additive described above as needed. The extra additive may be applied in an amount of 0.01 to 1 wt %.

The composition for the first surface layer applied to the first surface layer 100 and the composition for the second surface layer applied to the second surface layer 200 may independently comprise the first polyvinyl acetal or the second polyvinyl acetal in an amount of 66 to 74 wt % and the plasticizer in an amount of 25 to 33 wt %, respectively. In addition, the additive described above may be comprised in the compositions in an amount of 0.01 to 1 wt % as needed. In these cases, the surface layers having glass adhesion quality of suitable intensity and excellent mechanical strength can be formed.

The composition for the second interlayer applied to the second interlayer 400 and the composition for the third interlayer applied to the third interlayer 500 may independently comprise the fourth polyvinyl acetal or the fifth polyvinyl acetal in an amount of 57 to 72 wt % respectively and the plasticizer in an amount of 27 to 42 wt %. In addition, when improvement of fluidity is needed the compositions may comprise a trioxane-based compound in an amount of 0.001 to 0.4 wt % and may comprise the additive described above in an amount of 0.01 to 1 wt % as needed. In these cases, interlayer heterogeneity is alleviated and the second interlayer or the third interlayer of which optical properties of the film are enhanced can be manufactured.

The compositions may be manufactured by the method of melting extruding in an extruder which each composition is put into, laminating through a laminating device such as a feed block, and forming into a film shape on a T-die and so on, for example may be manufactured by the way of co-extrusion.

A manufacturing method of the film for laminating glass according to one or more other example embodiments of the present disclosure comprises an extruding step, a laminating step and a forming step.

The extruding step is a step of kneading extruding i) a composition for surface layers comprising a first polyvinyl acetal and ii) a composition for interlayers comprising a plasticizer, a third polyvinyl acetal and a trioxane-based compound in an amount of 0.001 to 4 wt %, respectively.

As the composition for surface layers the composition for the first surface layer and the composition for the second surface layer may be selectively or all applied. In this case, the film for laminating glass with three-layers structure described above may be manufactured.

The detailed description about the composition for the first surface layer, the composition for the second surface layer and the composition for the interlayers is duplicated with the above description, thus further detailed description thereof will be omitted here.

The extruding step may further comprise a process of selective or all kneading extruding the composition for the second interlayer and the composition for the third interlayer. In this case the film for laminating glass with five-layers structure described above may be manufactured.

The laminating step may be a step of laminating a surface layer molten resin containing the extruded composition for the surface layer and an interlayer molten resin containing the composition for the interlayer, wherein the extruded composition for surface layers is laminated to be placed on and under the extruded composition for the interlayer, thereby manufacturing a laminated molten resin.

In the case of manufacturing the film for laminating glass with five-layers, the laminated molten resin may further comprise the second interlayer molten resin or the third interlayer molten resin between the surface layer molten resin and the interlayer (the first interlayer) molten resin.

To such laminating ordinary laminating methods may be applicable, specifically a feed block, a multi manifold and so on may be applied but is not limited thereto.

The forming step is a step of forming the laminated molten resin into a sheet shape and manufacturing the film for laminating glass. Specifically, the forming comprises the process of forming the molten resin into a sheet shape and making a film through T-die and so on.

In the case of manufacturing the film for laminating glass with applying the manufacturing method of the film for laminating glass of the present disclosure, when a multilayer film is manufactured applied with 2 or more compositions having different composition and fluidity from each other, particularly the fluidity of the interlayer is improved thereby the film for laminating glass of which optical properties such as a distortion are improved may be manufactured.

Figure 2:
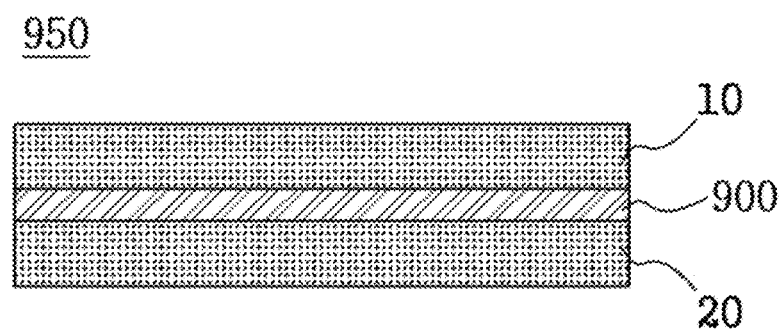
FIG. 2 is a drawing illustrating a section of a film for laminating glass according to one or more examples.

FIG. 2 is a drawing illustrating a section of a film for laminating glass according to one or more examples. Referring to FIG. 2, laminated glass according to one or more examples of the present disclosure will be described. The laminated glass 950 comprises a laminate in which the film for laminating glass 900 described above is placed between two sheets of glass 10, 20.

The two sheets of glass 10, 20 are described as glass in the present specification but a material of a light transmission panel, such as plastic, transparent metal, and the like is also applicable.

The details about specific structure, composition, characteristics, the manufacturing method of the film for laminating glass 900 are duplicated with the above description, thus further detailed description thereof will be omitted here.

Figure 3:
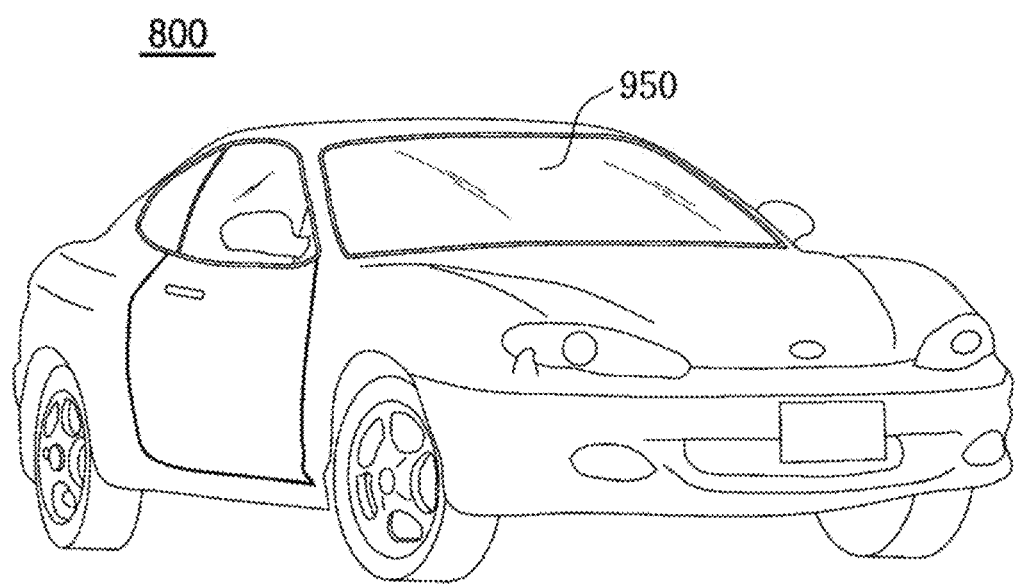
FIG. 3 is a drawing showing an example of laminated glass applied as a windshield to an automobile according to one or more examples.

FIG. 3 is a drawing showing an example of laminated glass applied as a windshield to an automobile which is an example of a vehicle, according to one or more examples.

Referring to the drawing, a vehicle 800 according to one or more examples of the present disclosure will be described. The vehicle 800 comprises a laminated glass described above. Specifically, the vehicle 800 comprises the laminated glass 950 as a windshield.

The windshield may be installed for shielding external wind from an interior and allow a user of the vehicle to observe the outside with naked eyes, and the laminated glass 950 described above may be applied as the windshield.

The vehicle 800 comprises a body forming a body of the vehicle, a powertrain attached to the body (engines, etc.), a drive wheel attached to be rotatable to the body, a connector connecting the drive wheel and the powertrain, and a windshield attached to a part of the body of the vehicle. The windshield may be a light transmission laminate shielding the interior of the vehicle from external wind.

The vehicle 800 may be an example of vehicles applied with a windshield, for example, the vehicle 800 may be an automobile, and the body, the powertrain, the drive wheel, and the connector may be applied without limit as units generally applied to an automobile.

The laminated glass 950 may be applied to an automobile that is the vehicle 800 as a windshield, and it may give the entire area of the laminated glass 950 excellent light transmission performance, impact resistance, and penetration resistance while providing the automobile with excellent optical properties.

Hereinafter, one or more example embodiments of the present disclosure will be described in more detail below.

Manufacture of a Film for Laminating Glass

1) Manufacture of a Polyvinyl Acetal Resin

Manufacture of a polyvinyl butyral resin (A): A polyvinyl alcohol resin having an average polymerization degree of 1700 and a saponification degree of 99 was mixed with n-butyl aldehyde, thereby obtaining a polyvinyl butyral resin (A) having butyral group of 54.5 mol % and hydroxyl group of 44.7 mol %.

Manufacture of a polyvinyl butyral resin (B): A polyvinyl alcohol resin having an average polymerization degree of 2400 and a saponification degree of 88 was mixed with n-butyl aldehyde, thereby obtaining a polyvinyl butyral resin (B) having butyral group of 63.1 mol % and hydroxyl group of 18.5 mol %.

2) Manufacture of a Film for Laminating Glass (Manufacture of a film in Example 1) The polyvinyl butyral resin (A) of 73 wt % and 3G8 of 27 wt % as a plasticizer were thrown into a twin screw extruder A and kneaded sufficiently (composition for a film A). The polyvinyl butyral resin (B) of 64 wt %, 3G8 of 34 wt % as a plasticizer, and 2,4,6-tripropyl-1,3,5-trioxane of 1 wt % as an additive were thrown into a twin screw extruder B and kneaded sufficiently (composition for a film B). Co-extrusion thereof was performed with (film A)/(film B)/(film A) structure thereby manufacturing a film in Example 1 wherein the thickness of each layer was 330 µm/120 µm/330 µm and a total thickness was 780 µm (where µm refers to microns) (structure in FIG. 1A).

(Manufacture of a film in Comparative Example 1) The polyvinyl butyral resin (A) of 73 wt % and 3G8 of 27 wt % as a plasticizer were thrown into a twin screw extruder A and kneaded sufficiently (composition for a film A). The polyvinyl butyral resin (B) of 64 wt %, 3G8 of 31 wt % as a plasticizer, and 2,4,6-tripropyl-1,3,5-trioxane of 5 wt % as an additive were thrown into a twin screw extruder B and kneaded sufficiently (composition for a film B). Co-extrusion thereof was performed with (film A)/(film B)/(film A) structure thereby manufacturing a film in Comparative Example 1 wherein the thickness of each layer was 330 µm/120 µm/330 µm and a total thickness was 780 µm.

(Manufacture of a film in Comparative Example 2) The polyvinyl butyral resin (A) of 73 wt % and 3G8 of 27 wt % as a plasticizer were thrown into a twin screw extruder A and kneaded sufficiently (composition for a film A). The polyvinyl butyral resin (B) of 64 wt % and 3G8 of 36 wt % as a plasticizer were thrown into a twin screw extruder B and kneaded sufficiently (composition for a film B). Co-extrusion thereof was performed with (film A)/(film B)/(film A) structure thereby manufacturing a film in Comparative Example 2 wherein the thickness of each layer was 330 µm/120 µm/330 µm and a total thickness was 780 µm.

Property Evaluation of the Film for Laminating Glass

Optical Defects (Distortion Test)

Manufactured films were cut to length of 10 cm and width of 10 cm, respectively, and inserted between two sheets of clear glass (length of 10 cm, width of 10 cm and thickness of 2.1 cm). Vacuum laminating thereof was performed for 30 seconds in a laminator under the condition of 110° C. and 1 atmospheric pressure, thereby pre-pressing of the laminated glass was carried out. After pre-pressing, the pre-pressed laminated glass was pressed for 20 minutes in an autoclave under the temperature of 140° C. and the pressure condition of 1.2 MPa, to obtain the laminated glass.

Figure 4:
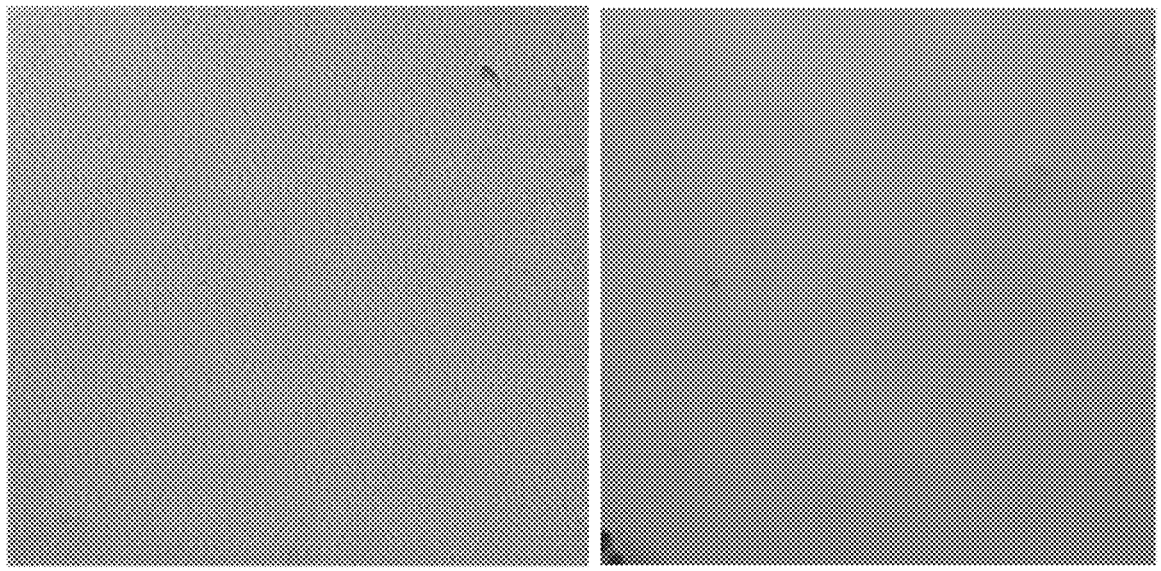
FIG. 4 is a photo showing the result of observing samples of films manufactured in example embodiments with naked eyes wherein one has an optical defect (distortion) occurred (left side) and the other has no optical defect (right side).

Obtained samples of the laminated glass were erected with intervals of 10 cm from a wall and illuminated by an LED light from behind 30 cm at an angle of 20 degrees. In their shadows on the wall, if distortion that was an optical defect was observed was checked. It was evaluated as Fail if distortion was seen, or evaluated as Pass if distortion was not seen (Refer to FIG. 4) and the result is shown in Table 1 below.

Measuring Method of Sound Insulation Performance Loss Factor (L/F)

Manufactured films were cut to length of 30 cm and width of 2.5 cm, respectively, and inserted between two sheets of clear glass (length of 10 cm, width of 10 cm and thickness of 2.1 cm). Vacuum laminating thereof was performed for 30 seconds in a laminator under the condition of 110° C. and 1 atmospheric pressure, thereby pre-pressing of the laminated glass was carried out. After pre-pressing, the pre-pressed laminated glass was pressed for 20 minutes in an autoclave under the temperature of 140° C. and the pressure condition of 1.2 MPa, to obtain the laminated glass used for measuring sound insulation performance. The manufactured glass samples were kept for 2 weeks in a constant temperature and humidity chamber under the condition of 20° C. and 20 RH % for stabilization, and thereafter sound insulation performance thereof was measured.

Measurement of sound insulation performance was carried out as follows. To the laminated glass vibration was given by a vibration generator for damp tests, and the vibration characteristics obtained from it were amplified by a mechanical impedance measuring device. The spectrum of vibration was analyzed with an FFT spectrum analyzer and then calculated by 1 dB method to obtain L/F (loss factor) value. It was evaluated as Pass if the obtained value was 0.34 or more, or evaluated as Fail if the obtained value was less than 0.34 and the result is shown in Table 1 below.

Moisture Resistance Test

Manufactured Films were cut to 10 cm×10 cm (width× length) to prepare specimens, and these specimens were digested for 3 hours in a constant temperature tank which was full of deionized water of 50° C. Thereafter the specimens were taken out and haze value thereof was observed.

It was evaluated as Pass if the variation of haze value before being placed in the constant temperature tank and after being placed in the constant temperature tank for the duration was 15% or less, or evaluated as Fail if the variation of haze value was greater than 15% and the result is shown in Table 1 below. The haze test was carried out by applying NDH 5000W model manufactured by Nippon Denshoku Co., Ltd to the center part of the specimens and measuring in accordance with JIS K 7105 standard.

Bleed Out Test

Manufactured Films were cut to 5 cm×5 cm (width× length) to prepare specimens, and these specimens were treated with heat for 10 minutes in a constant temperature oven heated to 75° C. Thereafter the specimens were taken out and their surfaces were rubbed with oil paper. When Observed with the naked eye it was evaluated as Pass if the oil paper was not stained, or evaluated as Fail if the oil paper was stained with something and the result was shown in Table 1 below.

Penetration Resistance Test

Penetration Resistance was evaluated with the specimens prepared above in accordance with KS L 2007.

Glass with 30 cm×30 cm and a thickness of 2.1 cm was laminated with the films manufactured above thereby manufacturing a laminate having glass-film-glass structure. It was pre-laminated in vacuum, thereby degassing and edge sealing thereof were performed. Thereafter, main laminating was carried out at 150° C. for 2 hours using an autoclave to prepare samples for property evaluation. To the samples for property evaluation dropping a hard ball of 2.27 kg was performed at about 20° C., and the height when a sample was penetrated by the ball measured. At that time, it was expressed as Fail if the sample was penetrated by the ball in a height under 4 m (meters), or expressed as Pass if the sample was penetrated by the ball in a height of 4 m or higher in Table 1.

Impact Resistance Test

Specimens were prepared and impact resistance was evaluated in accordance with KS L 2007:2008.

The specimens for property tests were prepared in the same manner as in the penetration resistance test.

As a low temperature test, dropping a hard ball of 227 g which was kept for 4 hours at about minus 20° C. was performed in a height of 9 m, and it was expressed as Fail if a sample which took impact was broken and when glass was scattered the amount of glass dropped from a sheet was 15 g or more, or expressed as Pass if a sample which took impact was not broken or when glass was scattered the amount of glass dropped from a sheet was less than 15 g.

As a room temperature test, dropping a hard ball of 227 g which was kept for 4 hour at about 40° C. was performed in a height of 10 m, and it was expressed as Fail if a sample which took impact was broken and when glass was scattered the amount of glass dropped from a sheet was 15 g or more, or expressed as Pass if a sample which took impact was not broken or when glass was scattered the amount of glass dropped from a sheet was less than 15 g.

TABLE 1

| | Content of a Trioxane-based Compound in an Interlayer (wt %)* | Sound Insulation Performance | Moisture Resistance | Optical Defect Distortion | Bleed out | Penetration Resistance | Impact Resistance |
|---|---|---|---|---|---|---|---|
| Example 1 | 1 | Pass | Pass | Pass | Pass | Pass | Pass |
| Comparative Example 1 | 5 | Pass | Fail | Pass | Pass | Pass | Pass |
| Comparative Example 2 | 0 | Pass | Fail | Fail | Pass | Pass | Pass |

*The content of 2,4,6-tripropyl-1,3,5-trioxane in an interlayer.

Referring to the results of Table 1, the samples of Example 1 and Comparative Example 1 applied with a trioxane-based compound as a fluidity improver could be confirmed as having superior optical properties compared to the sample of Comparative Example 2 applied with no trioxane-based compound. While not wishing to be bound by theory, it is thought to be the result obtained from the trioxane-based compound which prevents melt fracture or lowers the degree of melt fracture generation in surfaces of interlayers, wherein the melt fracture could be generated in the process of manufacturing interlayers that are comparatively sticky. But, when a trioxane compound is applied in an excessive amount like in Comparative Example 2, moisture resistance can be degraded instead. In addition, the effects of optical properties improvement and moisture resistance enhancement were confirmed as not adversely affecting mechanical properties. Therefore, it was confirmed that applying the trioxane-based compound that is an additive of the present disclosure in a right amount enables manufacture of the film for laminating glass in which distortion phenomenon as an optical defect was prevented and moisture resistance was enhanced.

According to the examples described herein, a film for laminating glass, a manufacturing method of the same and laminated glass including the same, provide the film having no or slight trace of melt fracture of an interlayer which may be generated in manufacturing processes, and so having excellent optical properties over the entire film. In addition, such optical properties are maintained at substantially the same level even after a moisture resistance test, thus, the film has excellent moisture resistance.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for laminating glass comprising:
a first surface layer;
a second surface layer opposite the first surface layer; and
an interlayer disposed between the first surface layer and the second surface layer,
wherein the interlayer comprises a plasticized third polyvinyl acetal and a trioxane-based compound.

2. The film for laminating glass of claim 1,
wherein the trioxane-based compound is comprised in an amount of 0.001 to 4 wt % with respect to a total weight of the interlayer.

3. The film for laminating glass of claim 1,
wherein a haze value of the film for laminating glass has a difference within 15% after a moisture resistance test, which comprises digesting the film in deionized water of 50° C. for 3 hours, compared to a haze value of the film for laminating glass before the moisture resistance test.

4. The film for laminating glass of claim 1,
wherein the first surface layer comprises a plasticized first polyvinyl acetal,
wherein the second surface layer comprises a plasticized second polyvinyl acetal,
wherein the interlayer comprises a monolayer structure comprising the plasticized third polyvinyl acetal and the trioxane-based compound, and
wherein an amount of a plasticizer comprised in the first surface layer is less than an amount of a plasticizer comprised in the interlayer.

5. The film for laminating glass of claim 4,
wherein the amount of the plasticizer comprised in the first surface layer and the amount of the plasticizer comprised in the interlayer have a difference of 5 to 18 wt %.

6. The film for laminating glass of claim 1,
wherein the first surface layer comprises a plasticized first polyvinyl acetal,
wherein the second surface layer comprises a plasticized second polyvinyl acetal, and
wherein the interlayer is a multilayer structure comprising:

a first interlayer comprising the plasticized third polyvinyl acetal and the trioxane-based compound;

a second interlayer comprising a plasticized fourth polyvinyl acetal disposed between the first interlayer and the first surface layer; and a third interlayer comprising a plasticized fifth polyvinyl acetal disposed between the first interlayer and the second surface layer, wherein an amount of plasticizer comprised in the first surface layer is less than an amount of plasticizer comprised in the first interlayer.

7. The film for laminating glass of claim 6, wherein an amount of hydroxyl group of the fourth polyvinyl acetal is a value between an amount of hydroxyl group in the first polyvinyl acetal and an amount of hydroxyl group in the third polyvinyl acetal.

8. The film for laminating glass of claim 1, wherein the trioxane-based compound is comprised in an amount of 1 wt % or less with respect to a total weight of the film for laminating glass.

9. The film for laminating glass of claim 1, wherein the trioxane-based compound comprises 1,3,5-trioxane skeleton, and 1 to 3 carbon atoms out of 3 carbon atoms in the skeleton independently have hydrogen or alkyl group having 1 to 5 carbon atoms, respectively.

10. A method for manufacturing the film for laminating glass according to claim 1, comprising:

kneading extruding i) a composition for a surface layer comprising a first polyvinyl acetal and ii) a composition for an interlayer comprising a plasticizer, a third polyvinyl acetal and a trioxane-based compound in an amount of 0.001 to 4 wt %, respectively;

laminating a surface layer molten resin comprising the extruded composition for a surface layer and an interlayer molten resin comprising a composition for an interlayer, wherein the extruded composition for a surface layer is laminated to be disposed on and under the extruded composition for an interlayer, thereby manufacturing a laminated molten resin; and forming the laminated molten resin into a sheet shape to manufacture a film for laminating glass.

11. A laminated glass comprising a laminate where the film for laminating glass according to claim 1 is disposed between two sheets of glass.

12. A vehicle comprising the laminated glass according to claim 11.

13. The film for laminating glass of claim 1, wherein the trioxane-based compound comprises either one or both of 1,2,4-trioxane skeleton and 1,2,3-trioxane skeleton.

14. The film for laminating glass of claim 1, wherein the trioxane-based compound is trialkyl trioxane, and selected from the group consisting of 2,4,6-trimethyl-1,3,5-trioxane, 2,4,6-triethyl-1,3,5-trioxane, 2,4,6-tri(n-propyl)-1,3,5-trioxane, 2,4,6-tri(iso-propyl)-1,3,5-trioxane, 2,4,6-tri(n-butyl)-1,3,5-trioxane, 2,4,6-tri(sec-butyl)-1,3,5-trioxane, 2,4,6-tri(isobutyl)-1,3,5-trioxane, 2,4,6-tri(tert-butyl)-1,3,5-trioxane, 2,4,6-tripentyl-1,3,5-trioxane and combinations thereof.

* * * * *